(12) United States Patent
Max et al.

(10) Patent No.: US 11,976,764 B2
(45) Date of Patent: May 7, 2024

(54) TUBULAR WITH SCREW THREAD

(71) Applicant: ITREC B.V., Schiedam (NL)

(72) Inventors: Nicolaas Thijs Pieter Max, Schiedam (NL); Pieter Dirk Melis Van Duivendijk, Schiedam (NL)

(73) Assignee: ITREC B.V., Schiedam (NL)

( * ) Notice: Subject to any disclaimer, the term of this patent is extended or adjusted under 35 U.S.C. 154(b) by 197 days.

(21) Appl. No.: 17/616,940

(22) PCT Filed: Jun. 5, 2020

(86) PCT No.: PCT/EP2020/065706
§ 371 (c)(1),
(2) Date: Dec. 6, 2021

(87) PCT Pub. No.: WO2020/245412
PCT Pub. Date: Dec. 10, 2020

(65) Prior Publication Data
US 2022/0307639 A1 Sep. 29, 2022

(30) Foreign Application Priority Data
Jun. 7, 2019 (NL) ...................................... 2023274

(51) Int. Cl.
*F16L 47/16* (2006.01)
*B29C 70/34* (2006.01)
(Continued)

(52) U.S. Cl.
CPC ............ *F16L 47/16* (2013.01); *B29C 70/345* (2013.01); *B29C 70/541* (2013.01); *B29C 70/86* (2013.01);
(Continued)

(58) Field of Classification Search
CPC . F16L 47/16; F16L 9/128; F16L 15/08; F16L 15/06; B29C 70/766; B29C 70/86; B29D 1/005
See application file for complete search history.

(56) References Cited

U.S. PATENT DOCUMENTS 3,381,715 A * 5/1968 Michael ................. F16L 47/16
285/423
3,673,029 A * 6/1972 McLarty ................ F16L 47/16
138/109
(Continued)

FOREIGN PATENT DOCUMENTS

| GB | 1 356 791 A | 6/1974 |
| JP | 2009-275846 A | 11/2009 |
| WO | WO 90/00236 A1 | 1/1990 |

OTHER PUBLICATIONS

International Search Report for PCT/EP2020/065706 (PCT/ISA/210) dated Nov. 25, 2020.
(Continued)

*Primary Examiner* — David Bochna
(74) *Attorney, Agent, or Firm* — Birch, Stewart, Kolasch & Birch, LLP

(57) ABSTRACT

The invention relates to an improved filament-reinforced tubular, and a method for providing such a tubular. A filament-reinforced tubular according to the invention comprises a tubular body (2), the tubular body comprising multiple fibre mats (10) encapsulated in a thermoset material (11), and is at least at one end provided with a male screw thread (3) comprising threading. According to the invention, the threading comprises a core member (12, 16). Furthermore, the threading comprises one or more fibre mats (13) that cover the core member. The one or more fibre mats are pulled between the windings of the core member by a positioning wire (14). The core member, the one or more
(Continued)

fibre mats, and the positioning wire, are encapsulated by a, preferably thermoset, cover material (15), which cover material defines the shape of the screw thread.

19 Claims, 2 Drawing Sheets

(51) Int. Cl.
  *B29C 70/54*     (2006.01)
  *B29C 70/86*     (2006.01)
  *E21B 17/043*    (2006.01)
  *F16L 9/128*     (2006.01)
  *F16L 15/00*     (2006.01)
  *F16L 15/08*     (2006.01)
  *B29K 309/08*    (2006.01)
  *B29L 23/00*     (2006.01)

(52) U.S. Cl.
  CPC ............ *E21B 17/043* (2013.01); *F16L 9/128* (2013.01); *F16L 15/003* (2013.01); *F16L 15/08* (2013.01); *B29K 2309/08* (2013.01); *B29L 2023/22* (2013.01)

(56) References Cited

U.S. PATENT DOCUMENTS

| | | | | |
|---|---|---|---|---|
| 3,713,932 A * | 1/1973 | Butzow | ................ | B29D 1/005 411/908 |
| 4,063,838 A | 12/1977 | Michael | | |
| 5,520,422 A * | 5/1996 | Friedrich | ................ | F16L 15/08 285/915 |
| 2011/0108149 A1* | 5/2011 | Xiao | ................ | F16L 15/06 138/109 |
| 2015/0198271 A1 | 7/2015 | Wright | | |
| 2019/0032821 A1 | 1/2019 | Sinclair | | |

OTHER PUBLICATIONS

Search Report of the NL priority application 2023274 dated Jun. 7, 2019.
Written Opinion of the International Searching Authority for PCT/EP2020/065706 (PCT/ISA/237) dated Nov. 25, 2020.

* cited by examiner

TUBULAR WITH SCREW THREAD

BACKGROUND OF THE INVENTION

(1) Field of the Invention

The invention relates generally to reinforced plastic tubulars.

(2) Description of Related Art

Filament reinforced tubulars, compared to steel tubulars, are light weight and do not corrode. Therefore, these type of tubulars are for example highly usable in the field of geothermal projects.

In contrast with steel tubulars, filament reinforced tubulars are less suited for machining, in particular are less suited for providing the tubulars with screw thread by way of machining.

It is generally known to machine screw threads, or threading, into the surface of tubulars. However, with filament reinforced tubulars, the filaments in the tubular are cut when machining the threading in the tubular. The machining process thus reduces the strength of the material, and in particular provides screw thread with only a limited capacity for carrying a load.

Therefore, with filament reinforced tubulars the screw thread is not cut into the tubular. To provide a reinforced tubular with the screw thread, the screw thread is build, with the tubular, on a die. Multiple layers of fiber mats are wound around a die comprising screw thread. The fiber mats are wound one over the other and are pushed into the windings of the die. Thus, reinforced screw threads are obtained that comprise continuous filaments throughout the cross section of the screw thread.

Unfortunately, the process of building a tubular including the screw thread, can not be used for tubulars obtained by a centrifugal casting process. In centrifugal or rotational casting, also known as spin casting or rotational moulding, a thermosetting resin is forced against an outer mould, which mould has been provided with one or more fiber mats, the mats comprising filaments in the form of for example glass fibers with an average length exceeding 50 mm. This process provides high quality tubulars with superior technical properties.

It is submitted that it is generally known to use thermoset material, typically in the form of a thermoset polymer matrix or synthetic matrix, in combination with reinforcements. In such polymer matrix composites, polymers act as binder or matrix to secure in place incorporated particulates, fibres or other reinforcements. Continuing research has led to an increased range of thermoset resins, polymers or plastics for use in the manufacture of polymer composites.

It is furthermore submitted that it is generally known to use fibre mats, e.g. glass fibre mats, as a reinforcement. These mats are layered one on top of the other during the manufacturing process and are comprised in the matrix material to provide a filament-reinforced material. Fibre mats may comprise woven or nonwoven glass fibres. Typically, multiple layers of fibre mats, the mats comprising woven fibre material, are used as a filament when manufacturing filament-reinforced tubulars.

As was set out above, machining screw thread into the surface of the tubular would sever the filaments in the tubular, and therefore reduces the strength of the material. This is in particular a problem when the tubulars are to be combined into a string that is suspended in a drilling hole. In such a string the axial load, due to the weight of the string, on the screw thread would be significant.

Also, tubulars obtained by centrifugal or rotational casting are made of a thermosetting material. It is therefore not an option to heat the tubular to temperatures above melt temperature and subsequently compress the end of the tubular in a mould to obtain the desired thread configuration in the surface of the tubular.

Therefore, these type of tubulars are typically connected using glued couplings, wherein the ends of tubulars are glued one to the other. Compared to screw couplings, these glued couplings have the drawback that they are time consuming make and are irreversible. Disconnecting the tubulars requires mechanically removing the coupling, e.g. by cutting.

It is an object of the invention to provide an improved filament-reinforced tubular, preferably of a thermoset material, in which the above mentioned drawbacks are eliminated altogether or occur in a greatly reduced extent. In particular it is an object of the first aspect of the invention to provide a centrifugal cast tubular of a thermoset material with a screw threat.

SUMMARY OF THE INVENTION

According to the present invention, this object is achieved by designing a filament-reinforced tubular.

In an embodiment, fibre mats comprising woven glass fibre material are used as a filament.

A filament-reinforced tubular, preferably for use in a geothermal well bore, comprises:

a tubular body, the tubular body comprising multiple fibre mats encapsulated in a thermoset material, wherein the tubular body is at least at one end, preferably at both ends, provided with male screw thread, the screw thread comprising threading, with a threading base and a threading top, and a root groove, with a root base as a bottom, between the threading, wherein the threading comprises a core member, the core member having multiple windings around the tubular body, such that the windings of the core member are separated by the root base, and wherein the core member extends, at least partially, radially outwards relative to the root base, wherein the threading comprises one or more fibre mats that cover the core member, and wherein the one or more fibre mats are pulled between the windings of the core member and onto the root base by a positioning wire, and wherein the core member, the one or more fibre mats, and the positioning wire, are encapsulated by a thermoset cover material, which cover material defines the shape of the screw thread.

The one or more fibre mats that cover the core member, wherein the one or more fibre mats are pulled between the windings of the core member and onto the root base by a positioning wire, provide the screw thread with increased strength. In particular, the fibre mats in combination with the cover material allow for providing the windings of the screw thread with a core member, thus increasing the structural strength of the threading, and for a better load transfer from between the screw thread and the tubular body of the filament-reinforced tubular.

Preferably, the final form of the screw thread is fully defined by the layer of cover material, more in particular by the mould used to apply the cover material. In an embodiment, the cover material bay be subjected to machining to fine tune the dimensional properties of the screw thread.

In an embodiment, the core member is created by machining the root groove in the tubular body, cutting through multiple fibre mats in the tubular body, such that the core member is formed by part of the tubular body, the part of the core member comprising multiple fibre mats encapsulated in a thermoset material.

In this embodiment, the core member is an integral part of the tubular body, and is a continuation of the material configuration of the tubular body. The layered structure of the fibre mats in the tubular body continues in the core member. Covering the core member with multiple fibre mats and a cover material provides a threading with increased strength and allows for a good load transfer between the threading and the tubular body.

In an alternative embodiment, the core member is a strand of filament material, for example a yarn of reinforcement fibres, the strand of filament material extending over the tubular body, and thus over the fibre mats in comprised in the tubular body, and along a length of the threading.

In this embodiment, the core member is provided as a separated body, which separate body is integrated in the threading. Providing the core member in the form of a strand of filament material, extending along the threading, provides the threading with a continuous structure and thus contributes to the overall strength of the threading. In particular because the orientation of the threading is parallel to the threading.

In another alternative embodiment, the core member is a strand of filament material, for example a yarn of reinforcement fibres, the strand of filament material extending along a length of the threading, and wherein the threading further comprises:

a core member anchoring area, wherein the anchoring area is created by machining an anchoring groove in the tubular body, cutting through multiple fibre mats in the tubular body, such that the windings of the anchoring groove are separated by the root base;

wherein the core member is partially located in the anchoring area, and forms the core of the threading.

In this embodiment, the core member is provided as a separated body, that is partially embedded in the structure of the tubular body. Thus the load transfer between the threading and the structure of the tubular body section is improved. Providing the core member in the form of a strand of filament material, extending along the threading, provides the threading with a continuous structure and thus contributes to the overall strength of the threading. In particular because the orientation of the threading is parallel to the threading.

Thus, in a filament-reinforced tubular according to the invention, the core member forms the core of the threading. The core member can be an integral part of the tubular body, comprising multiple fibre mats of the tubular body separated by a root groove machined in the fibre mats of tubular body, or the core member can be a strand of filament material, e.g. a strand go glass fibres, wherein the strand of filament material extends over the tubular body or is partially located in the anchoring groove machined in the fibre mats of the tubular body. The threading thus comprises the core member, one or more fibre mats that cover the core member, and a thermoset cover material, which cover material encapsulates the core member and the fibre mats, and thus defines the outer shape of the threading.

It is submitted that providing a filament reinforced tubular with screw thread, in particular by building a screw thread on the a tubular body, was believed to result in screw thread having a limited strength. This was in particular the case for tubulars obtained by centrifugal or rotational casting of a thermoset material.

It has now been found that providing a tubular body, of a thermoset material and obtained by centrifugal or rotational casting, with screw thread of which the threading comprises a core member and fibre mats, which fibre mats are positioned by a positioning wire and secured in place and a cover layer that also defines the shape of the screw thread, results in tubulars with improved strength.

It is submitted that the strength of a tubular, more in particular the strength of the threading of a tubular, according to the claimed invention allows for constructing pipe strings, for example for use in a geothermal well bore, wherein the weight load of the string is transferred via the screw thread of the tubulars, in particular of tubulars comprising a tubular body obtained by centrifugal or rotational casting of a thermoset material. Up to now, these kind of strings were build using glued couplings, which is involves a time consuming and irreversible process. Thus, the invention allows for tubular strings of filament reinforced tubulars that can be efficiently assembled and disassembled by using screw couplings.

In an embodiment of a filament-reinforced tubular according to the invention, the screw thread is provided on a tapered end section of the tubular, wherein the tapered end section cuts through multiple fibre mats encapsulated in the thermoset material of the tubular body. Thus, loads can be transferred via the screw thread to multiple layers of fibre mats, instead of only to the top layers of fibre mats, of the tubular body.

In an embodiment of a filament-reinforced tubular according to the invention, the tubular body is made by way of centrifugal or rotational casting, preferably by way of centrifugal or rotational casting a thermosetting material. It is submitted that the invention is pin particular useful for these kind of tubulars, which up to now were coupled using glue coupling.

In an embodiment of a filament-reinforced tubular according to the invention, the tubular is further provided with a torque-lock mounting area adjacent the screw thread, wherein the mounting area preferably is provided with grip enhancing surface features for securing a torque lock against rotation about the longitudinal axis of the tubular, and wherein the grip enhancing surface features comprise multiple parallel rib elements and/or parallel slots, for cooperating with rib elements and/or slots provided on the inside of the torque lock, for securing the torque lock against rotation about the longitudinal axis of the tubular.

It is a further object of the invention to provide a riser section comprising two filament-reinforced tubulars, each provided with screw thread. According to the present invention, this object is achieved by a riser section according to the invention.

Such a riser section comprises two filament-reinforced tubulars according to the invention and a coupling sleeve connecting the two tubulars, wherein the coupling sleeve comprises screw thread at opposite ends for cooperating with the screw thread provided on the tubulars, and wherein the tubulars are each with one end screwed into the coupling sleeve.

In an embodiment, the riser section further comprising two torque locks, wherein the torque locks are mounted each on a tubular, on opposite ends of the coupling sleeve, wherein the torque locks are on an inside surface provided with grip enhancing surface features for engaging the grip enhancing surface features of the torque-lock mounting area of the tubulars, and wherein the torque locks engage the coupling sleeve such that they block rotation of the torque locks relative to the coupling sleeve, to thus secure the respective tubulars against rotation relative to the coupling sleeve.

It is a further object of the invention to provide an improved coupling between two filament-reinforced tubulars, wherein the coupling allows for elongation of the tubulars when axially loaded. It is yet a further object of the invention to provide a riser section comprising such an improved coupling. According to the present invention, this object is achieved by providing a riser section according to the invention.

In an embodiment of a riser section according to the invention, the torque locks engage the coupling sleeve such that they, while blocking rotational movement, allow for axial movement of the torque locks, and thus of the tubulars, relative to the coupling sleeve, and thus allow for elongation of the sections of the tubulars comprising the screw thread, when the tubulars are loaded in an axial direction.

In a further embodiment of a riser section according to the invention, the torque locks are provided with coupling teeth, the coupling teeth extending in an axial direction, and wherein the coupling sleeve is at opposite ends provided with coupling teeth, the coupling teeth extending in an axial direction, and wherein the coupling teeth of the torque locks are configured to cooperate with the coupling teeth of the coupling sleeve, and wherein the coupling teeth of the coupling sleeve are configured to cooperate with the coupling teeth of the torque locks.

In an embodiment of a riser section according to the invention, the coupling sleeve is made of steel, and wherein preferably the torque locks are made of steel.

In an embodiment of a riser section according to the invention, the screw thread of the coupling sleeve and the screw thread of the respective tubulars is configured to compensate for elongation of the tubulars, in particular of the section of the tubulars provided with screw thread, and preferably, wherein the screw thread on the tubulars, and the corresponding screw thread on the coupling sleeve, is provided on tapered section of the tubular and a tapered section of the coupling sleeve respectively.

In an embodiment of a riser section according to the invention, the pitch of the screw thread, i.e. the distance between adjacent windings, of the tubulars increases in a direction away from the end of the tubular, and the pitch of the screw threads of the coupling sleeve increases in a direction towards the end of the coupling sleeve, such that, when the tubulars are screwed into the coupling sleeve and the torque locks have been mounted to secure the rotational movement of the tubulars relative to the coupling sleeve:

in an unloaded condition, i.e. when there is no or only a limited axial load on the tubulars, only a limited number of windings, i.e. for the tubular windings located near the end of the tubular and for the coupling sleeve windings located away of the end of the coupling sleeve, is in engagement;

during an increase in axial load on the riser section, the tubulars, and in particular the section of the tubular comprising the screw thread, elongates, and an increasing number of windings of the tubulars come into engagement with the windings of the coupling sleeve; and in a fully loaded condition, i.e. when there is a significant axial load on the tubulars e.g. by the riser section supporting a riser hanging in a bore hole, all windings, i.e. for the tubular also the windings located away from the end of the tubular and for the coupling sleeve also the windings located near the end of the coupling sleeve, are in engagement.

In an embodiment of a riser section according to the invention, the coupling sleeve is provided with one or two sealing rings, such that the tubulars, when screwed into the couplings sleeve, abut a sealing ring with an outer end thereof.

The invention furthermore provides a tubular for providing a riser section according to the invention.

The invention furthermore provides a coupling assembly, comprising a coupling sleeve and two torque locks, for providing a riser section according to the invention.

The invention furthermore provides a riser comprising multiple riser sections according to the invention.

The invention furthermore provides a bore hole, preferably geothermal bore hole, provided with a string of tubulars comprising tubulars according to the invention, preferably comprising riser sections according to the invention.

The invention furthermore provides a geothermal facility comprising a bore hole according to the invention.

It is a further object of the invention to provide a method for obtaining a filament-reinforced tubular provided with screw thread. According to the present invention, this object is achieved by providing a method according to the invention.

A method for providing a filament reinforced tubular with screw thread, preferably to provide a tubular according to the invention, wherein the screw thread comprises threading, the threading having a threading base and a threading top, and a root groove between the threading, the root groove having a root base as a bottom, and wherein the filament reinforced tubular comprising a tubular body, and the tubular body comprising multiple fibre mats encapsulated in a thermoset material, comprises:

optionally: machining a tapered end on the tubular body, such that multiple layers of fibre mats of the tubular body are exposed;

providing the tubular with a core member for the threading, preferably at the tapered end of the tubular body, the core member having multiple windings around the tubular body, such that the windings of the core member are separated by the root base, and wherein the core member extends, at least partially, radially outwards relative to the root base;

winding one or more fibre mats around the core member and the root groove, preferably such that fibres in the fibre mat run parallel to the root groove cut in the tubular;

winding a positioning wire into the root groove, thus pulling the one or more fibre mats between the windings of the core member and onto the root base, preferably, the positioning wire is received in a fibre math, and the previous two steps are combined;

inserting fibre mat covered end of the tubular into a mould, wherein the mould defines the final shape of the screw thread;

injecting a cover material, preferably a thermoset cover material e.g. a molten resin, under pressure into a cavity between the end of the tubular and the mould, thus encapsulating the core member, the one or more fibre mats, and the positioning wire, and thus defining the shape of the screw thread;

after a setting period, increase pressure in the thermoset cover material to remove air bubbles from the mould; and removing the tubular from the mould.

In an embodiment, the method further comprises:

creating the core member for the threading by machining the root groove in the tubular body, preferably in the tapered end of the tubular body, thus cutting through multiple fibre mats in the tubular body, such that the core member for the threading is formed by part of the tubular body, the part of the core member comprising multiple fibre mats encapsulated in a thermoset material.

In an alternative embodiment, the method further comprises:

providing the core member as a strand of filament material, for example a yarn of reinforcement fibres, winding the strand of filament material around the tubular body such that the strand of filament material extends over the tubular body, and thus over the fibre mats in comprised in the tubular body, and along a length of the threading to be provided.

In an alternative embodiment, the method further comprises:

creating a core member anchor area by machining an anchoring groove in the tubular body, cutting through multiple fibre mats in the tubular body, such that the windings of the anchoring groove are separated by the root base; and providing the core member as a strand of filament material, for example a yarn of reinforcement fibres, winding the strand of filament material in the anchoring groove around the tubular body such that the strand of filament material extends along a length of the threading to be provided, and such that the core member is partially located in the anchor area, to form the core of the threading.

In an embodiment of the method, the positioning wire is received, preferably is integrated, in a strip shaped fibre mat, preferably along a side of the strip shaped fibre mat, and wherein the strip shaped fibre mat, more in particular the positioning wire, is wound around the tapered part of the tubular such that the subsequent windings of the strip shaped fibre mat overlap each other.

In an embodiment of the method, the tubular body of the filament reinforced tubular is obtained by rotational casting.

In an embodiment, the positioning wire comprises the same material as the reinforcing material of the tubular, for example comprises glass fibres woven into a strand. In an embodiment, the positioning wire is a strand of filament material, for example a yarn of reinforcement fibres.

Advantageous embodiments of the Filament reinforced tubular according to the invention and the method according to the invention are disclosed in the sub claims and in the description, in which the invention is further illustrated and elucidated on the basis of a number of exemplary embodiments, of which some are shown in the schematic drawing. In the figures, components corresponding in terms or construction and/or function are provided with the same last two digits of the reference numbers.

Whilst primarily presented for illustrative purposes with reference to one or more of the figures, any of the technical features addressed below may be combined with any of the independent claims of this application either alone or in any other technically possible combination with one or more other technical features.

DETAILED DESCRIPTION OF THE PREFERRED EMBODIMENTS

Figure 1:
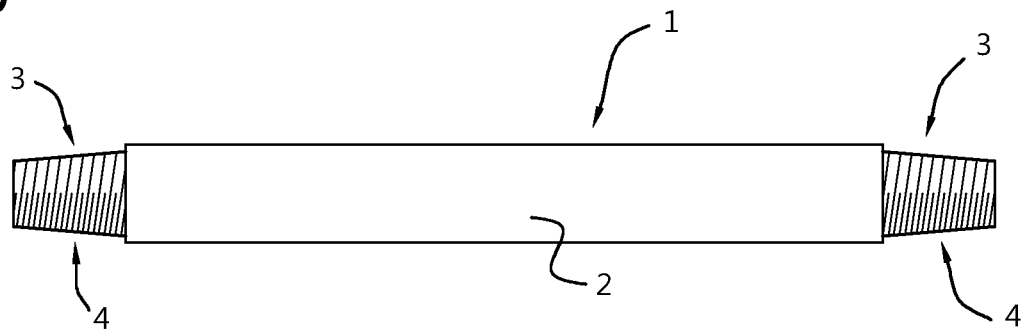
FIG. 1 schematically shows a side view of an exemplary embodiment of a filament-reinforced tubular according to the in the invention.

FIG. 1 shows a side view of a filament-reinforced tubular 1 according to the claimed invention. The filament reinforced tubular 1 comprises a tubular body 2.

It is submitted that such a filament-reinforced tubular is in particular suitable for use in a geothermal well bore, i.e. for contrasting a riser to be suspended in a well bore of a geothermal facility.

According to the invention, the filament-reinforced tubular 1 is provided with screw thread 3, more in particular a tubular body is provided with screw thread. In the embodiment shown, the tubular body 2 is at both ends, on tapered end sections of the tubular body, provided with male screw thread 3. The screw thread is built on the tubular body, as will be explained below.

Figure 2:
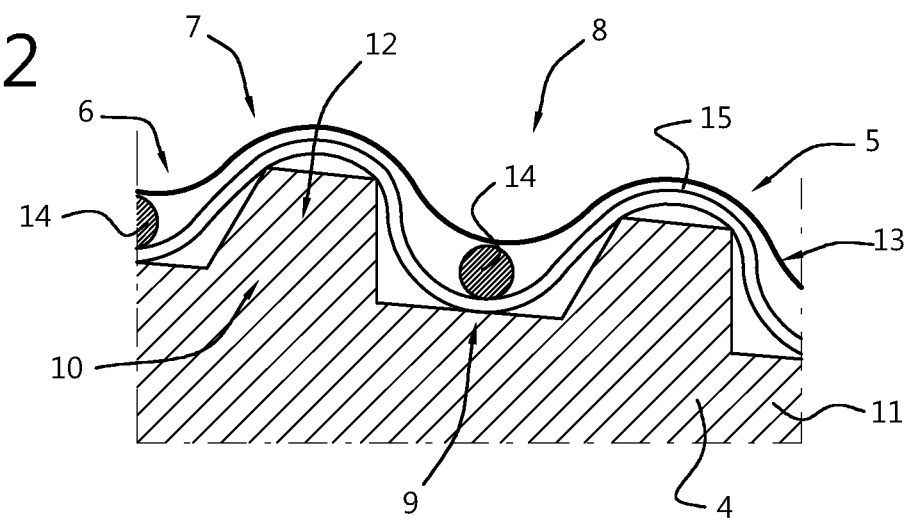
FIG. 2 schematically shows an enlarged partial side view in cross section of threading of the exemplary embodiment of a filament-reinforced tubular of FIG. 1.

FIG. 2 schematically shows an enlarged partial side view in cross section of threading, and part of the tubular body 2, of the screw thread of the filament-reinforced tubular of FIG. 1;

The screw thread 3 comprises threading 5. The threading has a threading base 6, a threading top 7, and a root groove 8, with a root base 9 as a bottom, located between the threading 5.

The tubular body 2 comprising multiple fibre mats 10 encapsulated in a thermoset material 11.

According to the invention, the threading 5 comprises a core member 12. The core member 12 has multiple windings around the tubular body 2, such that the windings of the core member are separated by the root base 9. The core member 12 forms the core of the threading, and extends radially outwards relative to the root base 9.

The threading 5 comprises one or more fibre mats 13, in the embodiment shown multiple fibre mats depicted as a single layer of fibre mats, that cover the core member 12. The fibre mats 13 are pulled between the windings of the core member 12 and onto the root base 9 by a positioning wire 14.

The core member 12, the one or more fibre mats 13, and the positioning wire 14, are encapsulated by a thermoset cover material 15, which cover material defines the shape of the screw thread 3.

In the exemplary embodiment shown in FIG. 1 and FIG. 2, the core member 12 is created by machining the root groove 8 in the tubular body 2, cutting through multiple fibre mats 10 in the tubular body 2, such that the core member 12 is formed by a part of the tubular body. The core member 12 comprises multiple fibre mats 13 encapsulated in a thermoset material.

In this embodiment, the core member 12 is an integral part of the original tubular body 2, and is a continuation of the material configuration of that tubular body. More in particular, the layered structure of the fibre mats 10 in the tubular body continues 2 in the core member 12. Covering the core member with multiple fibre mats 13 and the cover material 15 provides a threading with increased strength and allows for a good load transfer between the threading and the tubular body.

Figure 3:
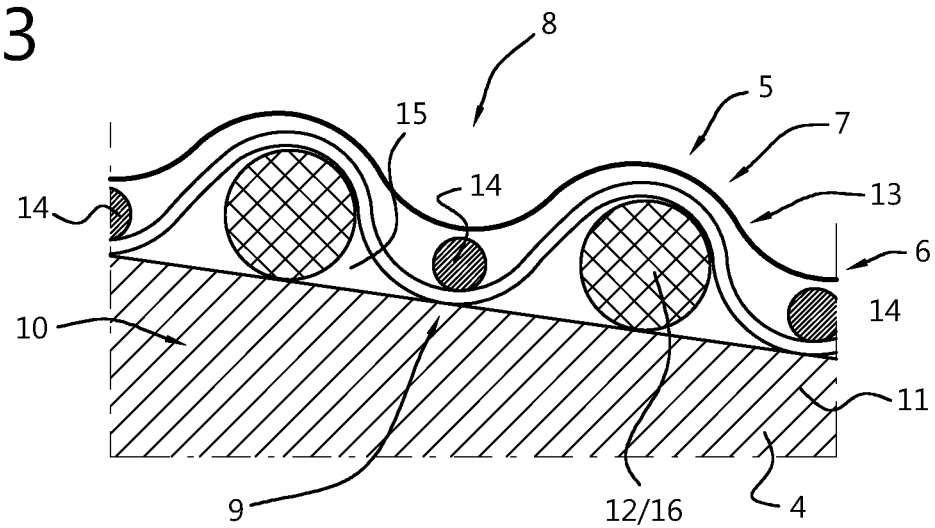
FIG. 3 schematically shows an enlarged partial side view in cross section of threading of an alternative exemplary embodiment of a filament-reinforced tubular.

In an alternative embodiment, shown in FIG. 3, the core member 12 is a strand of filament material 16, for example a yarn of reinforcement fibres. The strand of filament material 16, depicted in cross section perpendicular to the length of the strand, extends over the tubular body 2, and thus over the fibre mats 10 in comprised in the tubular body, and along a length of the threading.

In this embodiment, the core member 12 is provided as a separated body, i.e. strand 16, which separate body is integrated in the threading. Providing the core member 12 in the form of a strand of filament material, extending along the threading, provides the threading with a continuous structure and thus contributes to the overall strength of the threading. In particular because the orientation of the threading is parallel to the threading.

Figure 4:
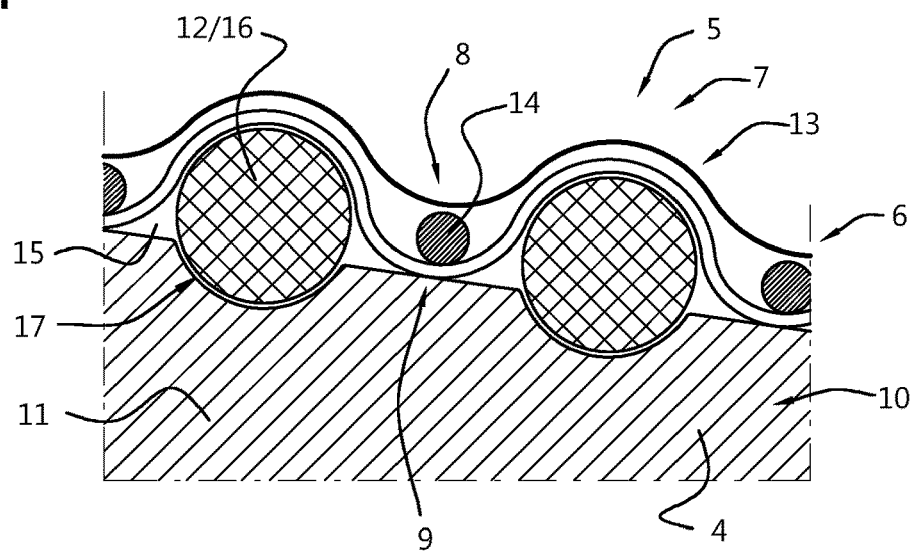
FIG. 4 schematically shows an enlarged partial side view in cross section of threading of another alternative exemplary embodiment of a filament-reinforced tubular.

In another alternative embodiment, shown in FIG. 4, the core member 12 is a strand of filament material 15, extending along a length of the threading, received in a core member anchoring area 17 of the tubular body 2.

The anchoring area 17 is created by machining an anchoring groove in the tubular body 2, cutting through multiple fibre mats 10 in the tubular body, such that the windings of the anchoring groove are separated by the root base 9. The core member 12 is partially located in the anchor area 17, extends in the radial direction relative to the tubular body and thus also extends partially in the threading. The core member is thus anchored in the tubular body and forms the core of the threading.

In this embodiment, the core member 12 is, similar to the embodiment shown in FIG. 3, provided as a separated body. In contrast with that embodiment, the core member is partially embedded in the structure of the tubular body. Thus the load transfer between the threading and the structure of the tubular body section is improved. Providing the core member in the form of a strand of filament material, extending along the threading, provides the threading with a continuous structure and thus contributes to the overall strength of the threading. In particular because the orientation of the threading is parallel to the threading.

Figure 5:
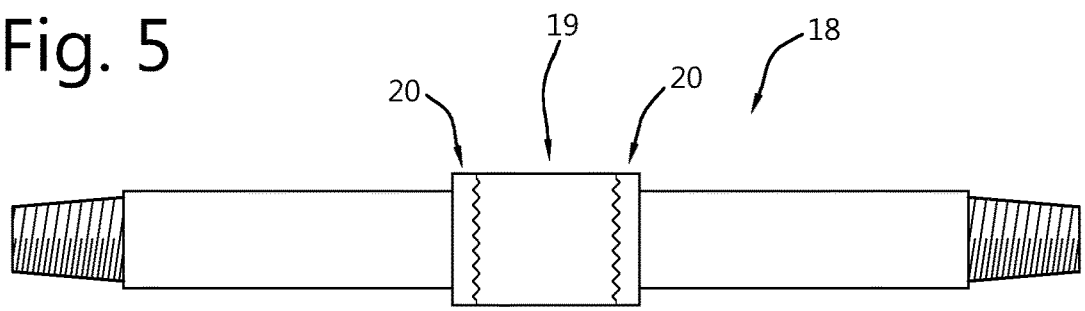
FIG. 5 schematically shows a side view of an exemplary embodiment of a riser section comprising two filament-reinforced tubulars coupled via a coupling sleeve according to the in the invention.

FIG. 5 schematically shows a side view of an exemplary embodiment of a riser section 18 comprising two filament-reinforced tubulars 1, coupled via a coupling sleeve 19, according to the in the invention.

Figure 6:
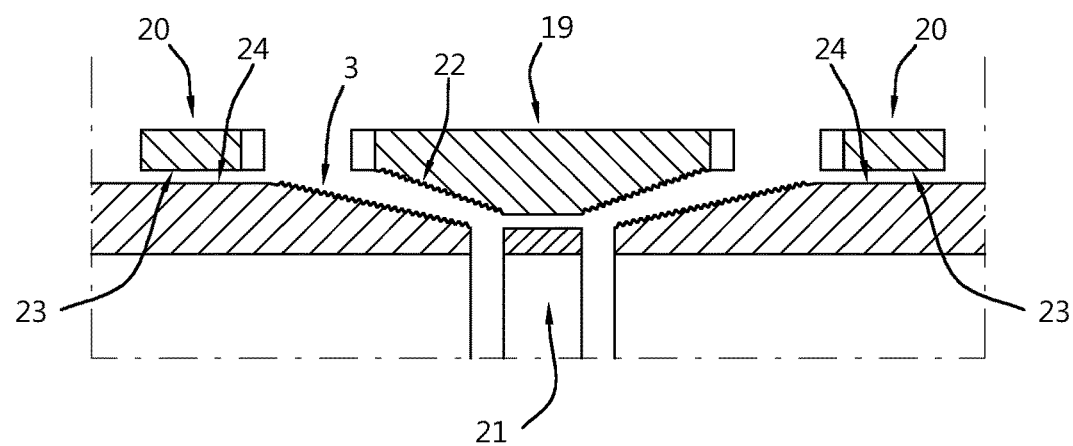
FIG. 6 schematically shows an enlarged partial exploded view in cross section of the exemplary riser section of FIG. 5.

FIG. 6 schematically shows an enlarged partial exploded view in cross section of the exemplary riser section 18, depicting part of the tubulars 1, part of the coupling sleeve 19 connecting the two tubulars, part of two torque locks 20 mounted on the tubulars, and part of a sealing ring 21, located between the ends of the two tubulars.

The two filament-reinforced tubulars 1 are each, at tapered end sections 4, provided with screw thread 3. The coupling sleeve 19 comprises screw thread 22 at opposite ends for cooperating with the screw thread 3 provided on the tubulars 1. The tubulars are each with one end screwed into the coupling sleeve.

In the embodiment shown, the riser section 18 further comprising two torque locks 20. The torque locks 20 are each mounted on a tubular 1, on opposite ends of the coupling sleeve 19. The torque locks 20 are on an inside surface provided with grip enhancing surface features 23 for engaging grip enhancing surface features 24 of a torque-lock mounting area of the tubulars.

The torque locks 20 engage the coupling sleeve 19 such that they block rotation of the torque locks relative to the coupling sleeve 19, to thus secure the respective tubulars against rotation relative to the coupling sleeve.

In the embodiment shown, the torque locks 20 engage the coupling sleeve 19 such that they, while blocking rotational movement, allow for axial movement of the torque locks 20, and thus of the tubulars 1, relative to the coupling sleeve 19. The torque locks and the coupling sleeve thus allow for elongation of the sections of the tubulars comprising the screw thread, when the tubulars are loaded in an axial direction.

It is noted that due to the section of the tubulars being tapered, to connected the threading with multiple layers of fibre mats in the tubular body, under load the tapered section may not show a linear elongation profile. Preferably, the screw thread of the coupling sleeve and the tubulars is configured to establish a uniform load transfer between the tubulars and the coupling sleeve. Preferably, the pitch of the screw thread, i.e. the distance between adjacent windings, of the tubulars increases in a direction away from the end of the tubular, and the pitch of the screw threads of the coupling sleeve increases in a direction towards the end of the coupling sleeve, such that, when the tubulars are screwed into the coupling sleeve and the torque locks have been mounted to secure the rotational movement of the tubulars relative to the coupling sleeve:

- in an unloaded condition, i.e. when there is no or only a limited axial load on the tubulars, only a limited number of windings, i.e. for the tubular windings located near the end of the tubular and for the coupling sleeve windings located away of the end of the coupling sleeve, is in engagement;
- during an increase in axial load on the riser section, the tubulars, and in particular the section of the tubular comprising the screw thread, elongate, and an increasing number of windings of the tubulars come into engagement with the windings of the coupling sleeve; and
- in a fully loaded condition, i.e. when there is a significant axial load on the tubulars e.g. by the riser section supporting a riser handing in a bore hole, all windings, i.e. for the tubular also the windings located away from the end of the tubular and for the coupling sleeve also the windings located near the end of the coupling sleeve, are in engagement.

REFERENCE SIGNS 01 filament-reinforced tubular
02 tubular body
03 screw thread
04 tapered end sections of the tubular body
05 threading
06 threading base
07 threading top
08 root groove
09 root base
10 fibre mats in tubular body
11 thermoset material 12 core member
13 fibre mats that cover the core member
14 positioning wire
15 thermoset cover material
16 strand of filament material
17 core member anchoring area
18 riser section
19 coupling sleeve
20 torque locks
21 sealing ring
22 screw thread coupling sleeve
23 grip enhancing surface features torque lock
24 grip enhancing surface features torque lock mounting area tubular

The invention claimed is:

1. A filament-reinforced tubular, comprising:
a tubular body, the tubular body comprising multiple fibre mats encapsulated in a thermoset material,
wherein the tubular body is at least at one end provided with a male screw thread, the screw thread comprising threading, with a threading base and a threading top, and a root groove, with a root base as a bottom, between the threading,
wherein the threading comprises a core member, the core member having multiple windings around the tubular body, such that the windings of the core member are separated by the root base, and wherein the core member extends radially outwards relative to the root base,
wherein the threading comprises one or more fibre mats that cover the core member, and wherein the one or more fibre mats are pulled between the windings of the core member and onto the root base by a positioning wire, and
wherein the core member, the one or more fibre mats, and the positioning wire, are encapsulated by a cover material, the cover material defining the shape of the screw thread.

2. The filament-reinforced tubular according to claim 1, wherein the core member is created by machining the root groove in the tubular body, cutting through multiple fibre mats in the tubular body, such that the core member is formed by a part of the tubular body, the part of the core member comprising multiple fibre mats encapsulated in a thermoset material.

3. The filament-reinforced tubular according to claim 1, wherein the core member is a strand of filament material, the strand of filament material extending over the tubular body, and thus over the fibre mats comprised in the tubular body, and along a length of the threading.

4. The filament-reinforced tubular according to claim 1, wherein the core member is a strand of filament material, the strand of filament material extending along a length of the threading, and wherein the threading further comprises:
a core member anchoring area, wherein the anchoring area is an anchoring groove that is machined in the tubular body, the anchoring groove cutting through multiple fibre mats in the tubular body, and wherein the windings of the anchoring groove are separated by the root base,
wherein the core member is partially located in the anchoring area, and forms the core of the threading.

5. The filament-reinforced tubular according to claim 1, wherein the screw thread is provided on a tapered end section of the tubular, wherein the tapered end section cuts through multiple fibre mats encapsulated in the thermoset material of the tubular body.

6. The filament-reinforced tubular according to claim 1, wherein the tubular body is made by way of centrifugal or rotational casting a thermosetting material.

7. The filament-reinforced tubular according to claim 1, wherein the tubular is further provided with a torque-lock mounting area adjacent the screw thread,
wherein the mounting area is provided with grip enhancing surface features for securing a torque lock against rotation about the longitudinal axis of the tubular, and
wherein the grip enhancing surface features comprise multiple parallel rib elements and/or parallel slots, for cooperating with rib elements and/or slots provided on the inside of the torque lock, for securing the torque lock against rotation about the longitudinal axis of the tubular.

8. A riser section, comprising:
two of the filament-reinforced tubulars according to claim 1 and
a coupling sleeve connecting the two tubulars,
wherein the coupling sleeve comprises a screw thread at opposite ends for cooperating with the screw thread provided on the tubulars, and wherein the tubulars are each with one end screwed into the coupling sleeve.

9. The riser section according to claim 8, wherein the screw thread of the coupling sleeve and the screw thread of the respective tubulars is configured to compensate for elongation of the tubulars,
wherein the pitch of the screw thread of the tubulars increases in a direction away from the end of the tubular, and the pitch of the screw threads of the coupling sleeve increases in a direction towards the end of the coupling sleeve, such that, when the tubulars are screwed into the coupling sleeve and the torque locks have been mounted to secure the rotational movement of the tubulars relative to the coupling sleeve:
in an unloaded condition, when there is no or only a limited axial load on the tubulars;
only a limited number of windings, for the tubular windings located near the end of the tubular and for the coupling sleeve windings located away of the end of the coupling sleeve, is in engagement;
during an increase in axial load on the riser section, the tubulars, and the section of the tubular comprising the screw thread, elongates, and an increasing number of windings of the tubulars come into engagement with the windings of the coupling sleeve; and
in a fully loaded condition, when there is a significant axial load on the tubulars, all windings, for the tubular also the windings located away from the end of the tubular and for the coupling sleeve also the windings located near the end of the coupling sleeve, are in engagement.

10. The riser section according to claim 8, wherein the coupling sleeve is provided with one or two sealing rings, such that the tubulars, when screwed into the couplings sleeve, abut a sealing ring with an outer end thereof.

11. A riser section, comprising:
two of the filament-reinforced tubulars according to claim 1; and
a coupling sleeve connecting the two tubulars,
wherein the coupling sleeve comprises a screw thread at opposite ends for cooperating with the screw thread provided on the tubulars, and wherein the tubulars are each with one end screwed into the coupling sleeve,
wherein the tubular is further provided with a torque-lock mounting area adjacent the screw thread, wherein the mounting area is provided with grip enhancing surface features for securing a torque lock against rotation about the longitudinal axis of the tubular, wherein the grip enhancing surface features comprise multiple parallel rib elements and/or parallel slots, for cooperating with rib elements and/or slots provided on the inside of the torque lock, for securing the torque lock against rotation about the longitudinal axis of the tubular, wherein the riser section further comprises two torque locks, wherein the torque locks are mounted each on a tubular, on opposite ends of the coupling sleeve, wherein the torque locks are on an inside surface provided with grip enhancing surface features for engaging the grip enhancing surface features of the torque-lock mounting area of the tubulars, and wherein the torque locks engage the coupling sleeve such that they block rotation of the torque locks relative to the coupling sleeve, to thus secure the respective tubulars against rotation relative to the coupling sleeve.

12. The riser section according to claim 11, wherein the torque locks engage the coupling sleeve such that they, while blocking rotational movement, allow for axial movement of the torque locks, and thus of the tubulars, relative to the coupling sleeve, and thus allow for elongation of the sections of the tubulars comprising the screw thread, when the tubulars are loaded in an axial direction.

13. A bore hole provided with a string of tubulars, the tubulars being the filament-reinforced tubular according to claim 1.

14. A method for providing a filament reinforced tubular with a screw thread, wherein the screw thread comprises threading, the threading having a threading base and a threading top, and a root groove between the threading, the root groove having a root base as a bottom, and wherein the filament reinforced tubular comprises a tubular body, the tubular body comprising multiple fibre mats encapsulated in a thermoset material, the method comprising:

providing the tubular with a core member for the threading, the core member having multiple windings around the tubular body, such that the windings of the core member are separated by the root base, and wherein the core member extends, at least partially, radially outwards relative to the root base;

winding one or more fibre mats around the core member and the root groove;

winding a positioning wire into the root groove, thus pulling the one or more fibre mats between the windings of the core member and onto the root base;

inserting the fibre mat covered end of the tubular into a mould, wherein the mould defines the final shape of the screw thread;

injecting a thermoset cover material under pressure into a cavity between the end of the tubular and the mould, thus encapsulating the core member, the one or more fibre mats, and the positioning wire, and thus defining the shape of the screw thread;

after a setting period, increasing pressure in the thermoset cover material to remove air bubbles from the mould; and removing the tubular from the mould.

15. The method according to claim 14, further comprising creating the core member for the threading by machining the root groove in the tubular body, thus cutting through multiple fibre mats in the tubular body, such that the core member for the threading is formed by part of the tubular body, the part of the core member comprising multiple fibre mats encapsulated in a thermoset material.

16. The method according to claim 14, further comprising providing the core member as a strand of filament material, and winding the strand of filament material around the tubular body such that the strand of filament material extends over the tubular body, and thus over the fibre mats comprised in the tubular body, and along a length of the threading to be provided.

17. The method according to claim 14, further comprising:

creating a core member anchor area by machining an anchoring groove in the tubular body, and cutting through multiple fibre mats in the tubular body, such that the windings of the anchoring groove are separated by the root base; and providing the core member as a strand of filament material, and winding the strand of filament material in the anchoring groove around the tubular body, such that the strand of filament material extends along a length of the threading to be provided, and such that the core member is partially located in the anchor area, to form the core of the threading.

18. The method according to claim 14, wherein the positioning wire is received in a strip shaped fibre mat, and wherein the strip shaped fibre mat is wound around a tapered end section of the tubular such that the subsequent windings of the strip shaped fibre mat overlap each other.

19. The method according to claim 14, wherein the tubular body of the filament reinforced tubular is obtained by rotational casting.

* * * * *